United States Patent
Rhoades

[11] Patent Number: 5,101,595
[45] Date of Patent: Apr. 7, 1992

[54] AUTOMATIC GATE OPENER WITH SAFETY PROVISIONS

[76] Inventor: David Rhoades, P.O. Box 547, Mason, W. Va. 25260

[21] Appl. No.: 722,252

[22] Filed: Jun. 27, 1991

[51] Int. Cl.⁵ .................... E05F 15/02; E05F 11/00
[52] U.S. Cl. .................................... 49/28; 49/139; 49/334; 49/335
[58] Field of Search .............. 49/28, 334, 335, 139, 49/340

[56] References Cited

U.S. PATENT DOCUMENTS

| | | | |
|---|---|---|---|
| 1,760,062 | 5/1930 | Hynes | 49/28 |
| 2,561,623 | 7/1951 | Hall | 49/334 |
| 3,955,661 | 5/1976 | Popper et al. | 49/28 X |
| 4,403,449 | 9/1983 | Richmond | 49/139 X |
| 4,564,098 | 1/1986 | Hormann | 49/28 X |
| 4,735,018 | 4/1988 | Duncan et al. | 49/340 |

FOREIGN PATENT DOCUMENTS 2481351  10/1981  France .................... 49/28

Primary Examiner—Philip C. Kannan
Attorney, Agent, or Firm—Gilbert Kivenson

[57] ABSTRACT

A gate opening mechanism is described which uses a rotationally floating motor. Unusually high torques caused by gate blockage causes the motor frame to rotate around its axis and to trigger a motor shut off switch.

The mechanism is mounted in the space between a fence post and the gate post adjacent to it without requiring a large opening.

5 Claims, 4 Drawing Sheets

AUTOMATIC GATE OPENER WITH SAFETY PROVISIONS

BACKGROUND OF THE INVENTION

This invention relates to an automatic gate opening apparatus which has provision for shut off when an object such as a person or a vehicle blocks the movement of the gate. The invention also incorporates means for authorized persons to manually open or close the gate in the event of a power failure.

Many power operated gate mechanisms have been developed; these have generally made use of a motor operated linkage which attaches to the gate and extends outwardly to move the gate on its hinges. The gate may be of the horizontally-opening, vertically withdrawn type or it may involve a turnstile or a horizontally sliding barrier. The automatic extension of a link arm in the prior art constitutes a hazard to an unwary person standing out of the way of the gate but still within contact range of the link arm. The gate itself presents a similar safety problem should it come in contact with a person standing in its path. In addition to doing bodily harm, the gate mechanism may itself be damaged when its motor is stalled to the point of overheating or its gears stripped if the drive mechanism develops excessive torque.

A further problem in the prior art is the complexity and expense of the gate opening apparatus. In efforts to provide sufficient power and safety, previous designs use relatively intricate mechanisms which are costly, complex to install and hard to repair in case of breakdown. The gate actuators of Richmond (U.S. Pat. No. 4,403,449), Duncan (U.S. Pat. No. 4,735,018) and Fior (French 2,481,351) utilize external extension arms for which additional actuating space outside of the roadway is required. The fact that these gate operators are most conveniently driven by a rotary power source such as an electric motor requires relatively elaborate linkages to convert the initial rotation to gate-activating motion. This can also be seen in the operators of Reid (U.S. Pat. No. 4,503,723), Gute (U.S. Pat. No. 3,284,950) and Weiss (U.S. Pat. No. 4,848,175). The manufacture, installation and maintenance of these operators are costly and normally confined to expensive fences and walls.

OBJECTIVES OF THE INVENTION

It is a primary objective of the present invention to provide direct gate operation without the use of external linkages.

It is a second objective of the present invention to provide a low cost system for automatic gate operation which is easily installed. It would thus be affordable by those who require only the relatively low security of a chain link or similar fence.

It is a further objective of the present invention to take advantage of the present moderate cost of high torque, easily reversible electric motors as a power source and thus reduce manufacturing cost of the gate operator.

It is a still further objective of the present invention to provide torque sensing means to detect undue resistance to gate motion and turn off the motor until the cause of the resistance is detected and eliminated.

It is an added objective of the present invention to allow the gate to be moved manually by authorized persons without damage to the operating mechanism when a power failure occurs or the electricity supply must be interrupted for another reason.

DETAILED DESCRIPTION OF THE INVENTION

Figure 1:
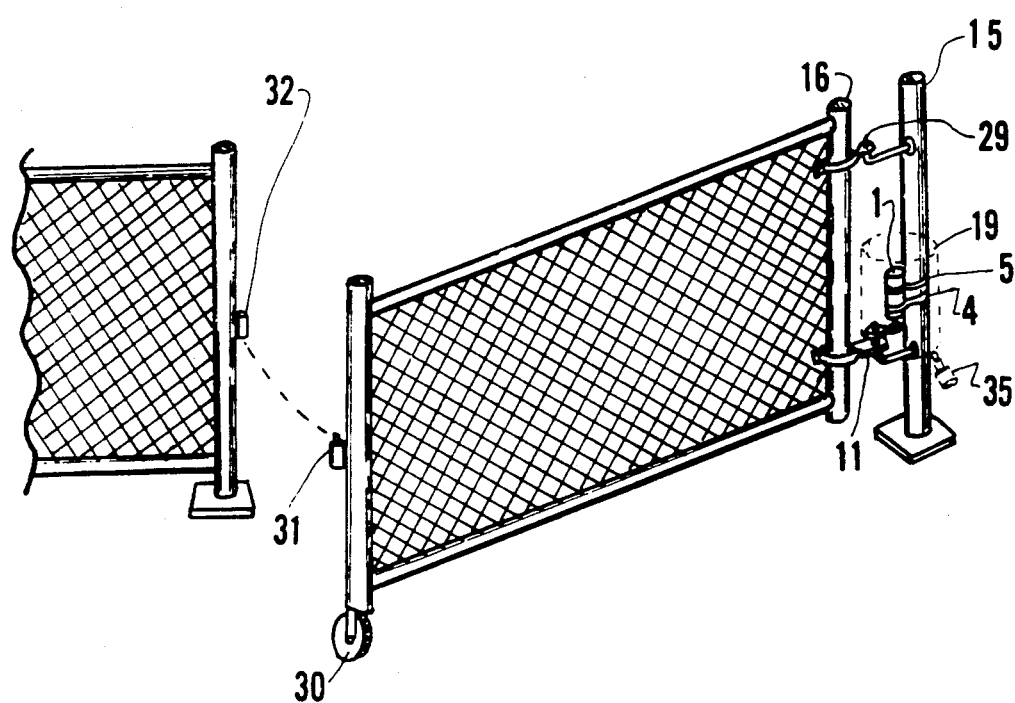
FIG. 1 is a perspective view of the gate operator as installed in a fence opening.

The general operation of the invention will be described by reference to FIGS. 1-5. A geared-head, reversible electric motor 1 is rotatably attached to fence post 15 by straps 4 and 5 through ball bearings 20 and 21. This type of mounting causes the motor housing to be rotatable independently of its shaft. This rotation is opposite in direction to that of the shaft when the latter encounters a resistive torque. Pinion gear 7 (FIG. 2) is mounted on the motor shaft and engages sector gear 10 which contains teeth over an arc of 120 degrees or any other angle suitable to a particular application. Sector gear 10 is releasably joined through a pin 8 to support platform 11 which is rigidly joined to gate post 16 by strap 27. Platform 11 contains the female half 28 of the lower gate hinge. The male half 12 is bolted to fence post 15. A conventional gate hinge 29 (FIG. 1) serves as an upper support for the gate. The gate is also supported by the trolley wheel 30. The latches 31 and 32 hold the gate in the closed position by means of a spring loaded ball and socket arrangement until the operator is actuated.

Figure 2:
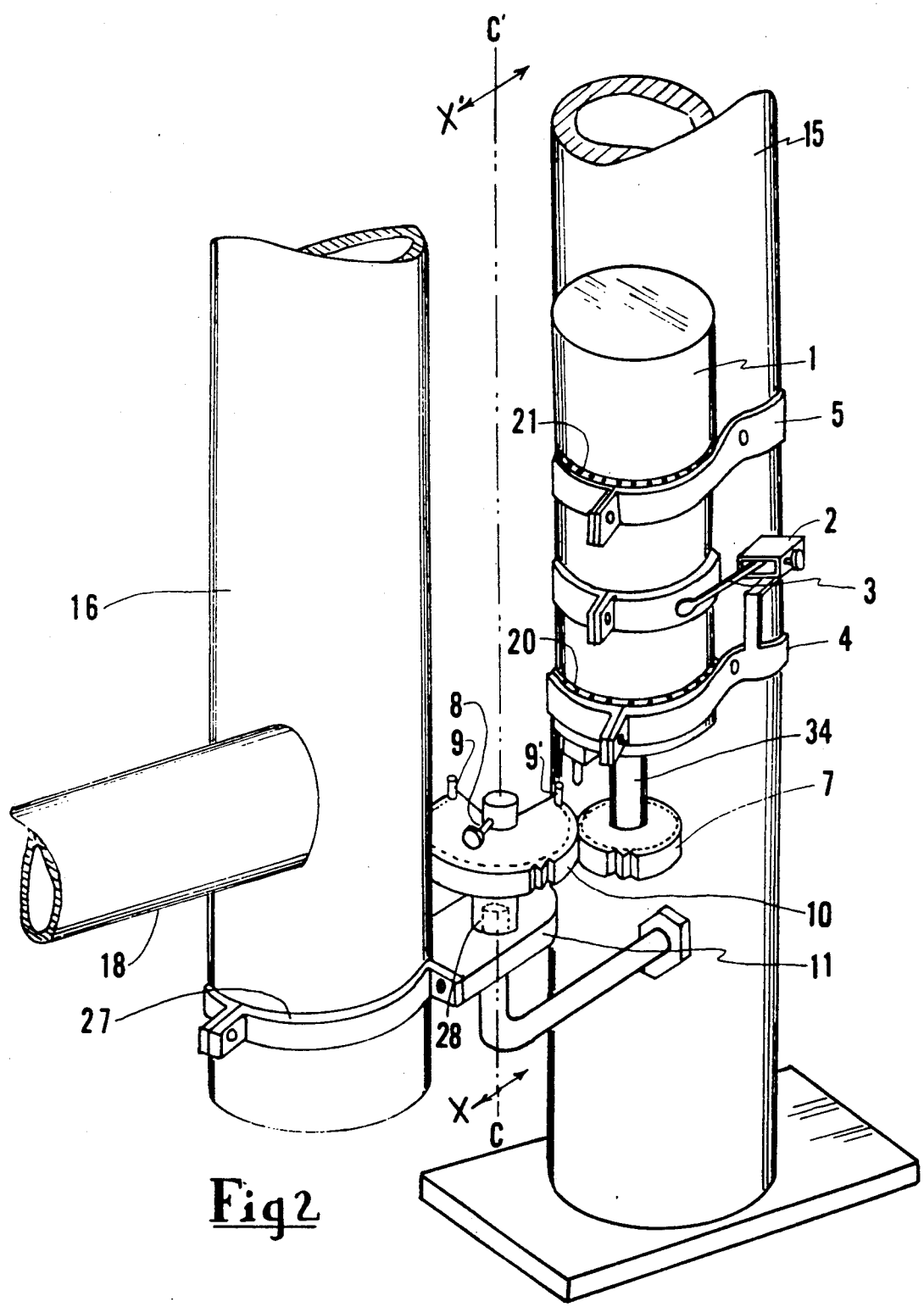
FIG. 2 is an enlarged perspective view of the operator.
Figure 3:
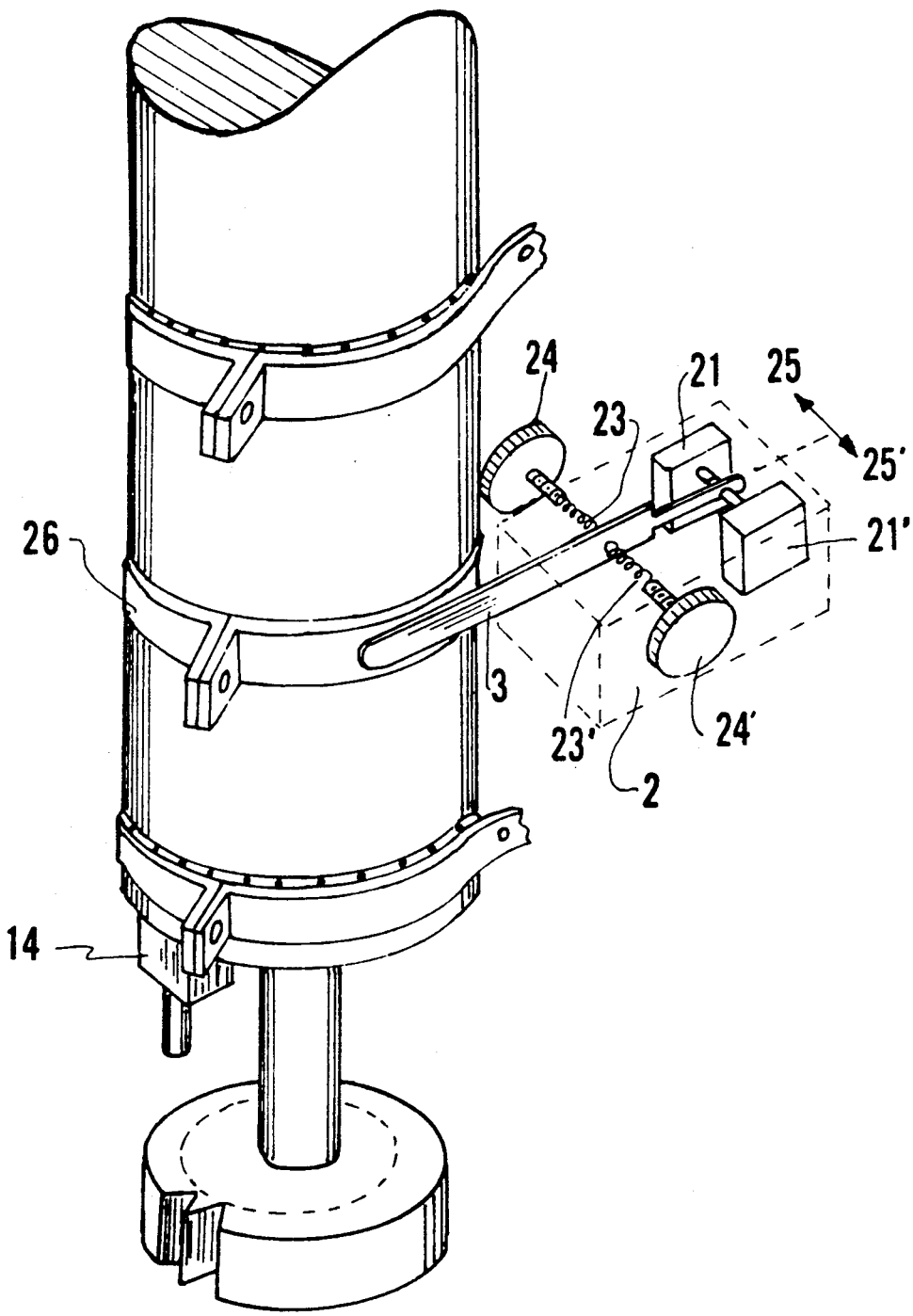
FIG. 3 is an enlarged perspective of the motor and its mounting showing a preferred form of torque sensing means.
Figure 4:
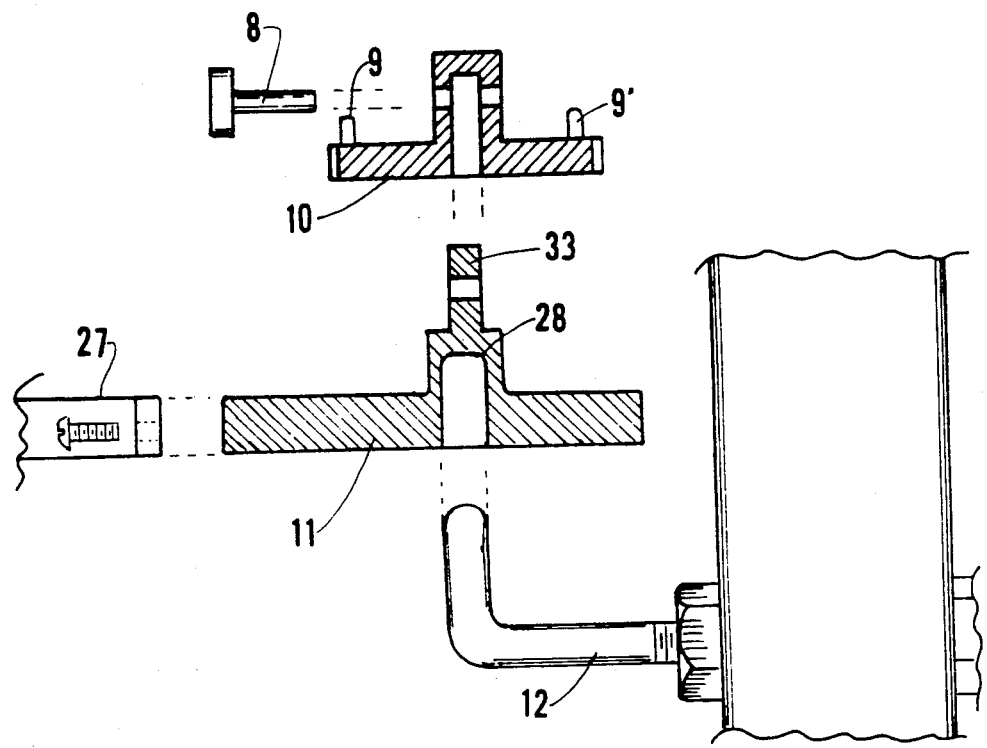
FIG. 4 is an expanded cross section view of the sector gear, support platform and axle of the invention taken across X—X' of FIG. 2.

The operation of the sector gear 10 will be explained by reference to FIGS. 2 and 4. When the motor 1 is actuated in either direction, pinion gear 7 revolves, turning sector gear 10 clockwise or counterclockwise. Sector gear 10 is joined to shaft 33 by release pin 8. Shaft 33 is an extension of platform 11 which is attached to gatepost 16; the gate will, as a result, turn on the axis C—C'. Projections 9 and 9' at each end of the sector gear will make contact with switch 14 (FIG. 3) at points which correspond to the gate being completely open closed. Actuation of switch 14 by either projection causes the motor to stop. With the gate closed, for example, a push button switch, radio signal or other means is employed to start the motor. When the gate reaches the completely open position, projection 9 or 9' encounters switch 14 and shuts off the motor. A second push button or other means is then used to restart the motor in the opposite direction as is presently done in the art.

A torque arm 3 is joined to a clamp 26 which encircles the motor housing. By virtue of its suspension in the ball bearings 20 and 21, the motor housing will tend to rotate in a direction opposite to that of the shaft 34. Thus the torque arm will move in the direction 25 or 25'. This motion is opposed by the adjustable springs 23 and 23' which are contained in the control box 2. The spring force on either side of torque arm 3 is adjusted by the threaded control knobs 24 and 24'. When the torque-opposing forces as applied by the springs is exceeded, torque arm 3 will close switch 21 or 21' which stops the motor. Restarting the motor in the same direction will result in a prompt shut down. The motor can only be restarted in the same direction if the source of the excess torque is found and removed. In gate operators not equipped with a torque limiting arrangement, an object obstructing the gate will stall the motor which may cause destructive temperature rise. Fuses and circuit breakers offer protection but are slower acting and not as accurately settable as the present torque switch. The torque feature of the present invention does not require resetting after a motor shutdown.

At the present time geared-head, high torque, direct current motors are being mass produced for use in such "cordless" appliances as hand drills, power screwdrivers and other tools. These direct current motors are easily reversed and contain internal storage batteries which are kept charged by power supplies operating on domestic 120 volt lines. The operation of the present invention is largely intermittent, a condition which is well suited to these types of motors. The relatively moderate cost of these units keeps the expense of manufacturing the invention down.

Figure 5:
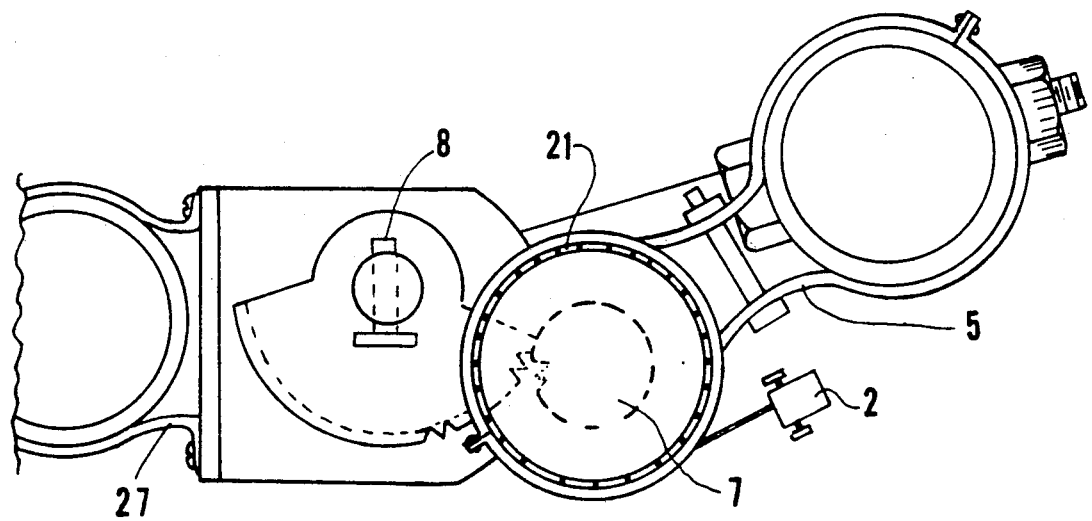
FIG. 5 is a plan view of the invention as mounted between the fence post and gate post of a horizontally operated gate.

FIGS. 1 and 5 show the relative positions of the motor, gears and the gate post to minimize the separation required between the fence post 15 and the gate post 16. A cover 19 is placed over the motor and external operating mechanism. The cover is locked by a conventional hasp and padlock 35.

The release pin 8 secures the sector gear 10 to its shaft 33. If the electric power should fail, cover 19 can be removed by an authorized person to permit removal of release pin 8. The gate can now be moved manually because shaft 33 is free to turn without engaging the gear train represented by sector gear 10, pinion gear 7 and the in-head gearing of the motor.

The present invention may be operated by pushbuttons placed on a post convenient to the driver of a motor vehicle or by radio signals from a suitable transmitter in the vehicle and a receiver relay system connected to the motor as is well known in the art.

The invention may be applied to vertically operated closures and other barriers as well as to the horizontally opening gate as described.

The battery operated, direct current motor of the present invention lends itself to use with solar generated power in remote locations where 120 volt lines are not available. At these sites the gate is often used only occasionally while the storage battery would be charged over long periods.

I claim:

1. A mechanism for automatically opening and closing gates comprised in combination of:
   a. a geared-head, reversible electric motor with its frame rotatably clamped through bearings to a fence post adjacent to a gate opening, the motor terminating at one end in a first shaft to which a pinion gear is fixed;
   b. a sector gear engaging the pinion gear, said sector gear having teeth on a portion of its circumference;
   c. a platform the upper surface of which contains a second shaft around which the sector gear can rotate;
   d. an opening in the lower surface of said platform to accept the male half of a gate hinge, the male half also being anchored to said fence post;
   e. removeable means for locking the sector gear to said second shaft to prevent rotation and inducing turning of the platform instead;
   f. clamping means for fixing the platform to one end of a gate;
   g. an upper gate hinge fixed between the fence post and one end of the gate;
   h. adjustable torque sensing means with switches arranged to shut off the electric motor should excess torque develop in either direction of the motor's rotation as a result of any gate obstruction;
   i. limit switching means to provide motor shut off when the gate has gone from its closed to open position, said limit switching means being equally applicable when the gate has gone from open to closed position.

2. A mechanism for automatically opening and closing gates as described in claim 1 in which said removeable means for locking the sector gear to the second shaft is a smooth pin which passes through holes drilled perpendicularly to the axis of rotation in both a hub of the sector gear and the second shaft so that removal of the pin allows the sector gear to turn independently of the platform and thus frees any manual movement of the gate from the gearing associated with the motor.

3. A mechanism for automatically opening and closing gates as described in claim 1 in which the limit switching means is made up of projections fixed to the sector gear and a spring loaded pushbutton switch fixed to the lower surface of the motor frame, the relative angular and radial spacings between projections and the switch actuation point being chosen so that the switch is operated whenever the gate is fully closed and whenever it is fully open.

4. A mechanism for automatically opening and closing gates as described in claim 1 in which said adjustable, torque-sensing means is made up of a strap attached to the motor body and a rigid arm joined to the end of the strap which arm terminates in a spring-balanced segment resting between two switches so that torque generated by the motor body as a reaction to the torque encountered by the pinion gear will cause the segment to overcome the force of one of the springs, make contact with one of the switches and thus shut off the motor.

5. A torque sensing means as set forth in claim 4 in which opposing springs resist movement of the segment towards either of the cut-off switches, the springs being adjustable to accommodate any desired torque sensing means being essentially free of friction effects such as sticking by virtue of the rotatable mounting of the motor housing.

* * * * *